(12) United States Patent
Lemmons

(10) Patent No.: US 7,971,926 B2
(45) Date of Patent: Jul. 5, 2011

(54) TRAILER HAVING REDUCED WEIGHT WALL CONSTRUCTION

(75) Inventor: Brian C. Lemmons, Katy, TX (US)

(73) Assignee: Vantage Trailers, Inc., Katy, TX (US)

( * ) Notice: Subject to any disclaimer, the term of this patent is extended or adjusted under 35 U.S.C. 154(b) by 918 days.

(21) Appl. No.: 11/537,392

(22) Filed: Sep. 29, 2006

(65) Prior Publication Data

US 2007/0029839 A1   Feb. 8, 2007

Related U.S. Application Data

(62) Division of application No. 11/112,489, filed on Apr. 22, 2005, now Pat. No. 7,178,860.

(51) Int. Cl.
*B60J 5/00* (2006.01)

(52) U.S. Cl. .................................................. 296/186.1

(58) Field of Classification Search ............... 296/186.1, 296/182.1, 184.1, 185.1, 186.3, 29; 52/284, 52/289.1, 589.1

See application file for complete search history.

(56) References Cited

U.S. PATENT DOCUMENTS

| | | | |
|---|---|---|---|
| 2,101,793 A | 12/1937 | Field | |
| 2,125,691 A | 8/1938 | Ragsdale et al. | |
| 2,489,670 A | 11/1949 | Powell, Jr. | |
| 2,753,018 A | 7/1956 | Curell | |
| 2,910,322 A * | 10/1959 | Magor | 296/183.1 |
| 2,912,253 A | 11/1959 | Harris et al. | |
| 3,185,519 A | 5/1965 | Turnbull et al. | |
| 3,440,790 A * | 4/1969 | Nerem | 52/631 |
| 3,608,955 A | 9/1971 | Tantlinger | |
| 3,655,087 A | 4/1972 | Luisada | |
| 3,772,997 A | 11/1973 | Heap et al. | |
| 3,801,993 A | 4/1974 | Stalder | |
| 3,814,479 A | 6/1974 | Vornberger | |
| 3,815,307 A * | 6/1974 | Tantlinger | 52/285.1 |
| 3,909,059 A | 9/1975 | Benninger et al. | |
| D237,271 S | 10/1975 | Lindell et al. | |
| 4,049,285 A | 9/1977 | Chieger | |
| 4,159,143 A * | 6/1979 | Proeschl | 296/29 |
| 4,403,804 A | 9/1983 | Mountz et al. | |
| 4,425,001 A * | 1/1984 | Mauri | 296/178 |
| 4,542,933 A | 9/1985 | Bischoff | |
| 4,938,524 A | 7/1990 | Straub et al. | |

(Continued)

OTHER PUBLICATIONS

Office Action issued for U.S. Appl. No. 11/176,037 dated Sep. 5. 2007 (24 pages).

(Continued)

*Primary Examiner* — Kiran B. Patel
(74) *Attorney, Agent, or Firm* — Smith IP Services, P.C.

(57) ABSTRACT

A trailer wall construction having reduced weight. A trailer wall construction includes a spherical shaped corner at a juncture of three walls. Each of the walls includes at least one panel having spaced apart inner and outer shells. Another trailer wall construction includes a generally vertically extending front or side wall and a floor. The floor and front or side wall each includes at least one panel comprising spaced apart inner and outer shells. A curved connector connects a lower edge of the front or side wall to an edge of the floor. Yet another trailer wall construction includes a wall with panels attached to one another along opposing edges of the panels, each of the panels including spaced apart inner and outer shells. One connector is attached to each of the panels along a third edge. Another connector is attached to each of the panels along a fourth edge.

12 Claims, 9 Drawing Sheets

U.S. PATENT DOCUMENTS

| | | | |
|---|---|---|---|
| 5,041,318 A * | 8/1991 | Hulls | 428/57 |
| 5,042,395 A | 8/1991 | Wackerle et al. | |
| 5,185,193 A | 2/1993 | Phenicie et al. | |
| 5,204,149 A | 4/1993 | Phenicie et al. | |
| 5,242,185 A | 9/1993 | Carr et al. | |
| 5,320,403 A | 6/1994 | Kazyak | |
| 5,338,080 A | 8/1994 | Janotik et al. | |
| 5,351,990 A | 10/1994 | Thomas | |
| 5,368,325 A | 11/1994 | Hazen | |
| 5,403,062 A | 4/1995 | Sjostedt et al. | |
| 5,403,063 A | 4/1995 | Sjostedt et al. | |
| 5,449,081 A * | 9/1995 | Sjostedt et al. | 220/1.5 |
| 5,472,290 A | 12/1995 | Hulls | |
| 5,488,770 A * | 2/1996 | Yamada et al. | 29/897.2 |
| 5,613,726 A | 3/1997 | Hobbs et al. | |
| 5,664,826 A * | 9/1997 | Wilkens | 296/186.1 |
| 5,685,229 A | 11/1997 | Ohara et al. | |
| 5,741,042 A | 4/1998 | Livingston et al. | |
| 5,934,739 A | 8/1999 | Waldeck | |
| 6,047,989 A | 4/2000 | Wood | |
| 6,065,261 A * | 5/2000 | Fehr et al. | 52/580 |
| 6,095,715 A * | 8/2000 | Hulls | 403/403 |
| 6,178,895 B1 | 1/2001 | Saxton et al. | |
| 6,224,125 B1 * | 5/2001 | McCormack | 296/24.3 |
| 6,224,144 B1 | 5/2001 | Veit-Salomon et al. | |
| 6,237,989 B1 | 5/2001 | Ammerlaan et al. | |
| 6,283,538 B1 | 9/2001 | Reitnouer | |
| 6,290,285 B1 | 9/2001 | McCormack | |
| 6,375,250 B1 | 4/2002 | McWilliams | |
| 6,425,626 B1 | 7/2002 | Kloepfer | |
| 6,502,895 B2 * | 1/2003 | Taylor | 296/178 |
| 6,513,297 B2 * | 2/2003 | Kloepfer | 52/588.1 |
| 6,669,271 B2 | 12/2003 | Booher | |
| 6,719,360 B1 * | 4/2004 | Backs | 296/186.1 |
| 6,793,273 B1 * | 9/2004 | Tuerk | 296/186.1 |
| 6,929,311 B2 | 8/2005 | Booher | |
| 6,979,051 B2 | 12/2005 | Jones et al. | |
| 7,014,252 B2 | 3/2006 | Booher | |
| 7,114,762 B2 | 10/2006 | Smidler | |
| 7,152,909 B2 | 12/2006 | Booher | |
| 7,178,860 B2 | 2/2007 | Lemmons | |
| D539,933 S | 4/2007 | Fischer | |
| 2001/0009085 A1 * | 7/2001 | Boyer | 52/236.9 |
| 2002/0190540 A1 | 12/2002 | Kloepfer | |
| 2003/0011211 A1 | 1/2003 | Booher | |
| 2004/0031230 A1 | 2/2004 | Pabedinskas et al. | |

OTHER PUBLICATIONS

Office Action issued for U.S. Appl. No. 11/537,415 dated Oct. 16, 2007 (6 pages).
Office Action issued for U.S. Appl. No. 11/566,091 dated Oct. 16, 2007 (12 pages).
Office Action for U.S. Appl. No. 11/537,415 dated Jun. 25, 2007.
Office Action for U.S. Appl. No. 11/537,448 dated Jun. 21, 2007.
Office Action for U.S. Appl. No. 11/223,581 dated Apr. 26, 2007.
Office Action for U.S. Appl. No. 11/566,091 dated Apr. 26, 2007.
Office Action issued for U.S. Appl. No. 11/176,037 dated Feb. 28, 2008 (17 pages).

* cited by examiner

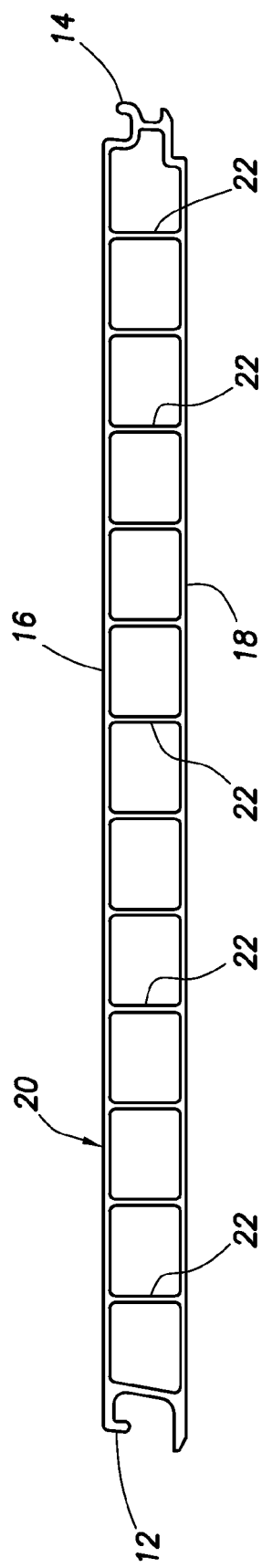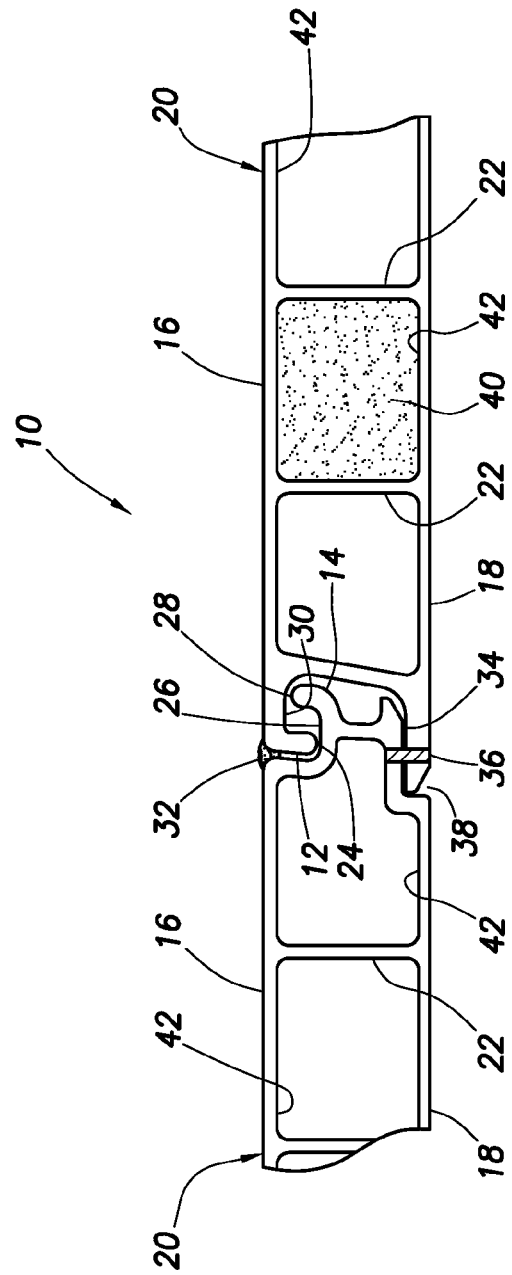
FIG. 1
FIG. 2

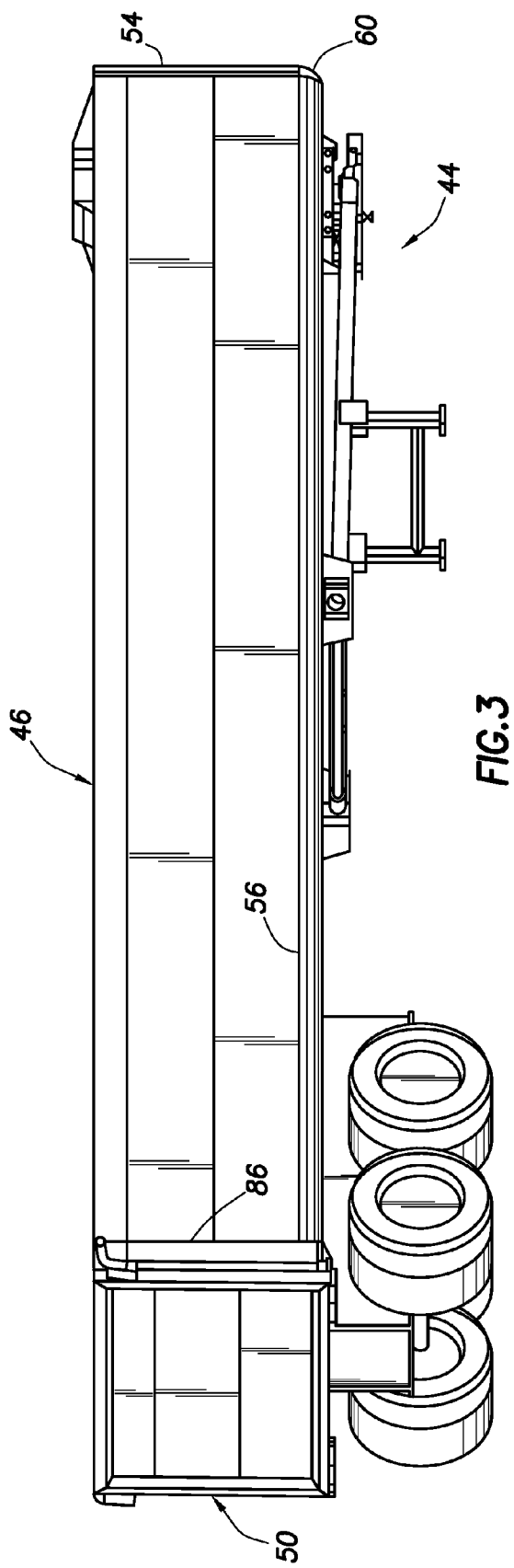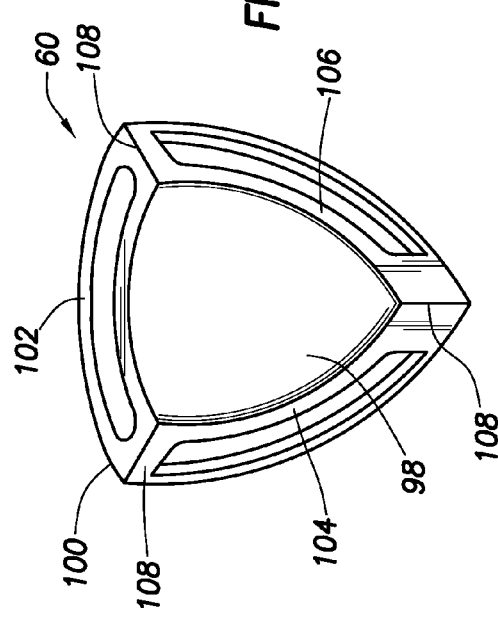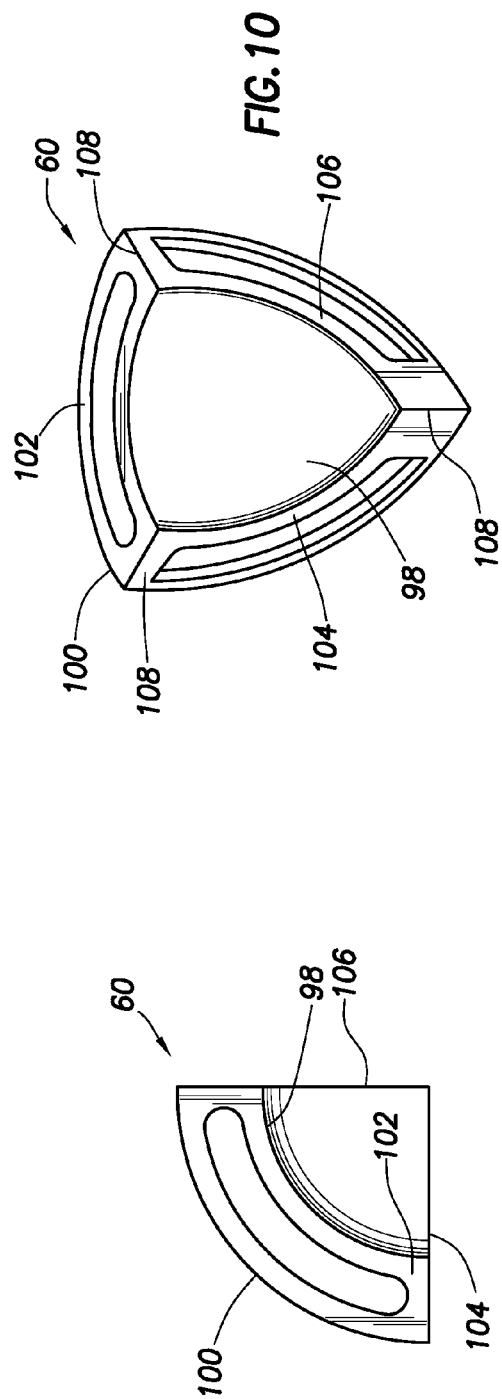

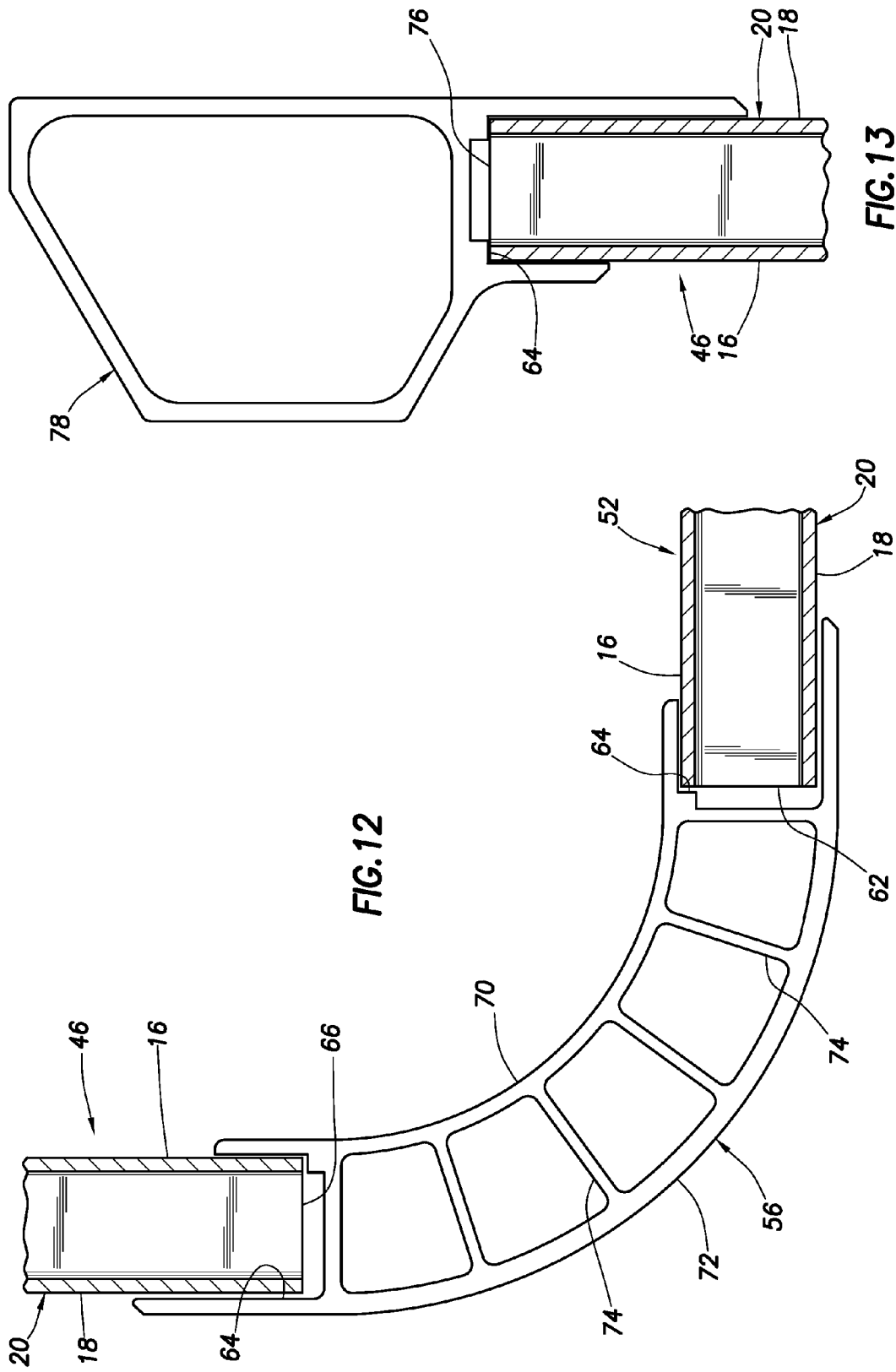

TRAILER HAVING REDUCED WEIGHT WALL CONSTRUCTION

CROSS-REFERENCE TO RELATED APPLICATION

This application is a division of prior application Ser. No. 11/112,489, filed Apr. 22, 2005, now U.S. Pat. No. 7,178,860 the entire disclosure of which is incorporated herein by this reference.

BACKGROUND

The present invention relates generally to wall construction used in trailer assemblies and, in an embodiment described herein, more particularly provides a reduced weight trailer wall construction.

It is very beneficial to be able to reduce the tare weight of a trailer used commercially to haul loads. For example, bridge laws and other regulations limit the gross weight of over-the-road vehicles. Thus, if the tare weight can be reduced, the weight of cargo can be increased, thereby resulting in more efficient and economical hauling operations.

Where a trailer is used to haul loose material, such as dirt, garbage, etc., it would be beneficial to provide a trailer wall construction which minimizes or eliminates square corners between the walls. This would prevent the loose material from being retained in the corners when the trailer load is dumped.

Another important consideration in trailer construction is aesthetics. It would be beneficial to be able to provide a trailer wall construction which is aesthetically pleasing, both at the time it is manufactured and after it has been in use.

Unfortunately, typical trailer wall construction methods have been unable to adequately satisfy the needs for reduced weight, minimized square corners between walls and improved aesthetics. Thus, it will be appreciated that a need exists for improved trailer wall construction. It is one of the objects of the present invention to provide to the art an improved trailer wall construction which satisfies at least one of the above described needs.

SUMMARY

In carrying out the principles of the present invention, a trailer wall construction is provided which solves at least one problem in the art. One example is described below in which a trailer wall is constructed using multiple extruded hollow aluminum alloy panels which are horizontally or vertically arranged in the wall. Another example is described in which curved connectors are used to connect trailer walls. Yet another example is described in which a spherical shaped corner for the trailer walls has spherical shaped spaced apart inner and outer shells.

In one aspect of the invention, a trailer wall construction is provided which includes a spherical shaped corner at a juncture of three walls. Each of the walls includes at least one panel comprising spaced apart inner and outer shells.

In another aspect of the invention, a trailer wall construction includes a generally vertically extending front wall and a floor. Each of the floor and front wall includes at least one panel comprising spaced apart inner and outer shells. A curved connector connects a lower edge of the front wall to a front edge of the floor.

In a further aspect of the invention, a trailer wall construction includes a generally vertically extending side wall and a floor. Each of the floor and side wall includes at least one panel comprising spaced apart inner and outer shells. A curved connector connects a lower edge of the side wall to a side edge of the floor.

In yet another aspect of the invention, a trailer wall construction includes a wall having multiple panels attached to one another, each of the panels having first and second edges opposite each other and third and fourth edges opposite each other, the panels being attached to one another along the first and second edges, and each of the panels including spaced apart inner and outer shells. A first connector is attached to each of the panels along the third edge. A second connector is attached to each of the panels along the fourth edge.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

FIG. 1 is a cross-sectional view of a panel used in a trailer wall construction embodying principles of the present invention;

FIG. 2 is an enlarged scale cross-sectional view of a manner of attaching two of the panels of FIG. 1;

FIG. 3 is a rear quarter elevational view of a trailer assembly incorporating the trailer wall construction of the invention;

FIG. 9 is a plan view of a spherical shaped corner of the trailer wall construction;

FIG. 10 is an isometric view of the spherical shaped corner;

FIG. 12 is a cross-sectional view of a juncture of a side wall with a floor of the alternate trailer wall construction; and FIG. 13 is a cross-sectional view of a top connector on the side wall of the alternate trailer wall construction.

DETAILED DESCRIPTION

Figure 4:
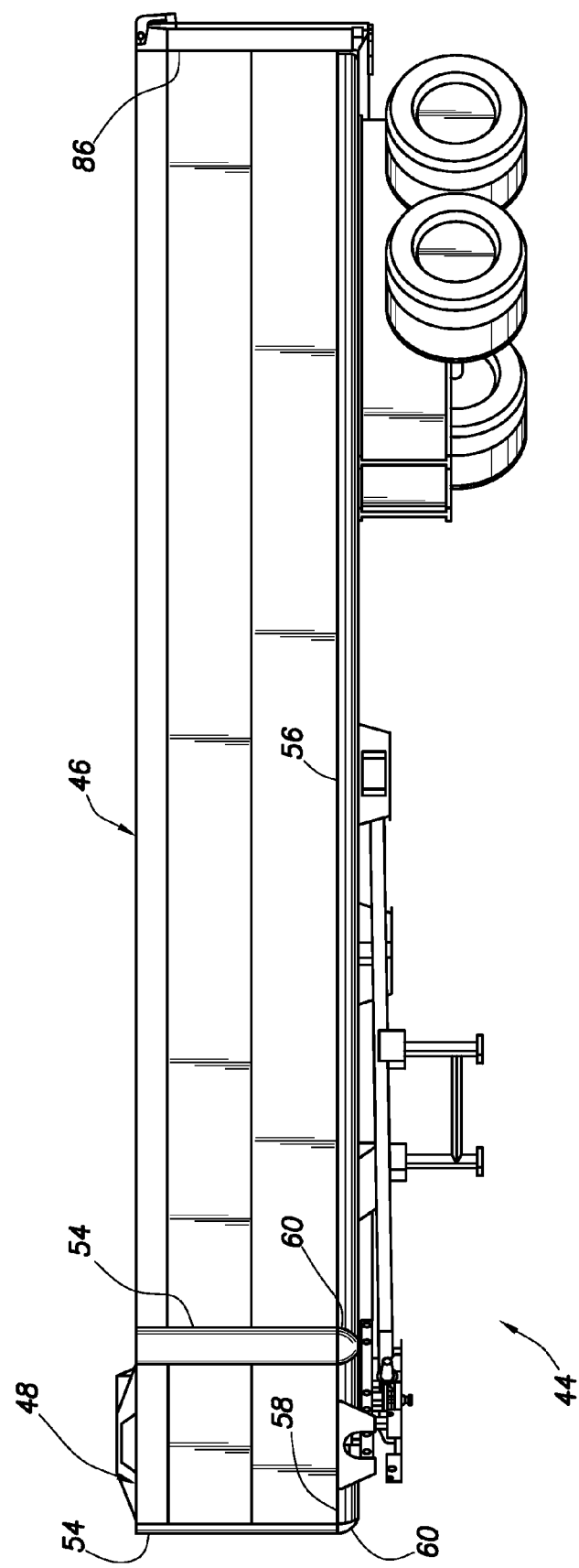
FIG. 4 is a front quarter elevational view of the trailer assembly.

Representatively illustrated in FIG. 1 is a cross-sectional view of a panel 20 which is used in a trailer wall construction 10 (see FIG. 2) embodying principles of the present invention. In the following description of the trailer wall construction 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, the panel 20 preferably consists of an integrally formed hollow extruded item made of an aluminum alloy. However, it should be clearly understood that other methods of constructing the panel 20 could be used. For example, the panel 20 could be made of other materials, could be made up of multiple pieces joined together, etc.

The panel 20 is configured so that it has interlocking opposite edges 12, 14. Extending between the edges 12, 14 are spaced apart shells 16, 18. Preferably, when the panels are used in the trailer wall construction 10, the shell 16 is an inner shell (facing toward an interior of the trailer) and the shell 18 is an outer shell (facing toward an exterior of the trailer), but these positions could be reversed if desired.

The shells 16, 18 are preferably smooth, flat, plate-like structures. This provides a good appearance (for example, outer surfaces of the shells 16, 18 could be polished, etc.). In addition, if the inner shell 16 is deformed or punctured, this may not be visible from the exterior of the trailer since the outer shell 18 may not also be deformed or punctured.

Multiple spaced apart interior webs 22 join the inner and outer shells 16, 18. This strengthens the panel 20 and provides support for the shells 16, 18 between the edges 12, 14. Any number, spacing, configuration, or other arrangement of the interior webs 22 may be used in keeping with the principles of the invention.

The manner in which the edges 12, 14 can be interlocked to join two of the panels 20 may be seen more clearly in FIG. 2. Note that an inwardly extending projection 24 formed on the edge 12 is retained in a recess 26 formed on the edge 14, and an outwardly extending projection 28 formed on the edge 14 is retained in a recess 30 formed on the edge 12. This retention of the projections 24, 28 in the recesses 26, 30 helps to prevent the edges 12, 14 from being disengaged from each other after they are interlocked.

To provide a rigid attachment of the panels 20 to each other, various methods may be used. Preferably, the inner shells 16 are welded to each other with a weld 32 along a seam between the inner shells, and the edges 12, 14 are further adhesively bonded to each other at a flat surface interface 34 where the edges overlap each other. Alternatively, or in addition, one or more mechanical fasteners 36 (such as blind rivets, screws, etc.) may be used at the interface 34, extending through the overlapping edges 12, 14.

Of course, many other methods of attaching the edges 12, 14 to each other could be used. For example, a weld could be used in a seam 38 between the edges 12, 14 to weld the outer shells 18 to each other, etc. Furthermore, the inner shells 16 and/or the edges 12, 14 could be joined using techniques in which friction is used to cause the structures to fuse to each other. Thus, it will be appreciated that the invention is not limited to the attachment methods specifically described herein.

Also depicted in FIG. 2 is a method of reinforcing the shells 16, 18, for example, to prevent the shells from being damaged, to make the panel 20 more rigid, etc. Specifically, a hardenable material 40 is flowed in a fluid state into a cavity 42 formed between the inner and outer shells 16, 18 and the interior webs 22, and then allowed to set or harden. Although only shown in one cavity 42 in FIG. 2, if the material 40 is used to reinforce the shells 16, 18 then preferably it is used in each of the cavities in the panels 20.

As used herein, the term "hardenable material" is used to indicate materials which become more rigid from a flowable state. Examples of hardenable materials include, but are not limited to, materials which become rigid (such as polycarbonates, other polymers, epoxies, etc.), foamed materials, gels, etc.

Figure 5:
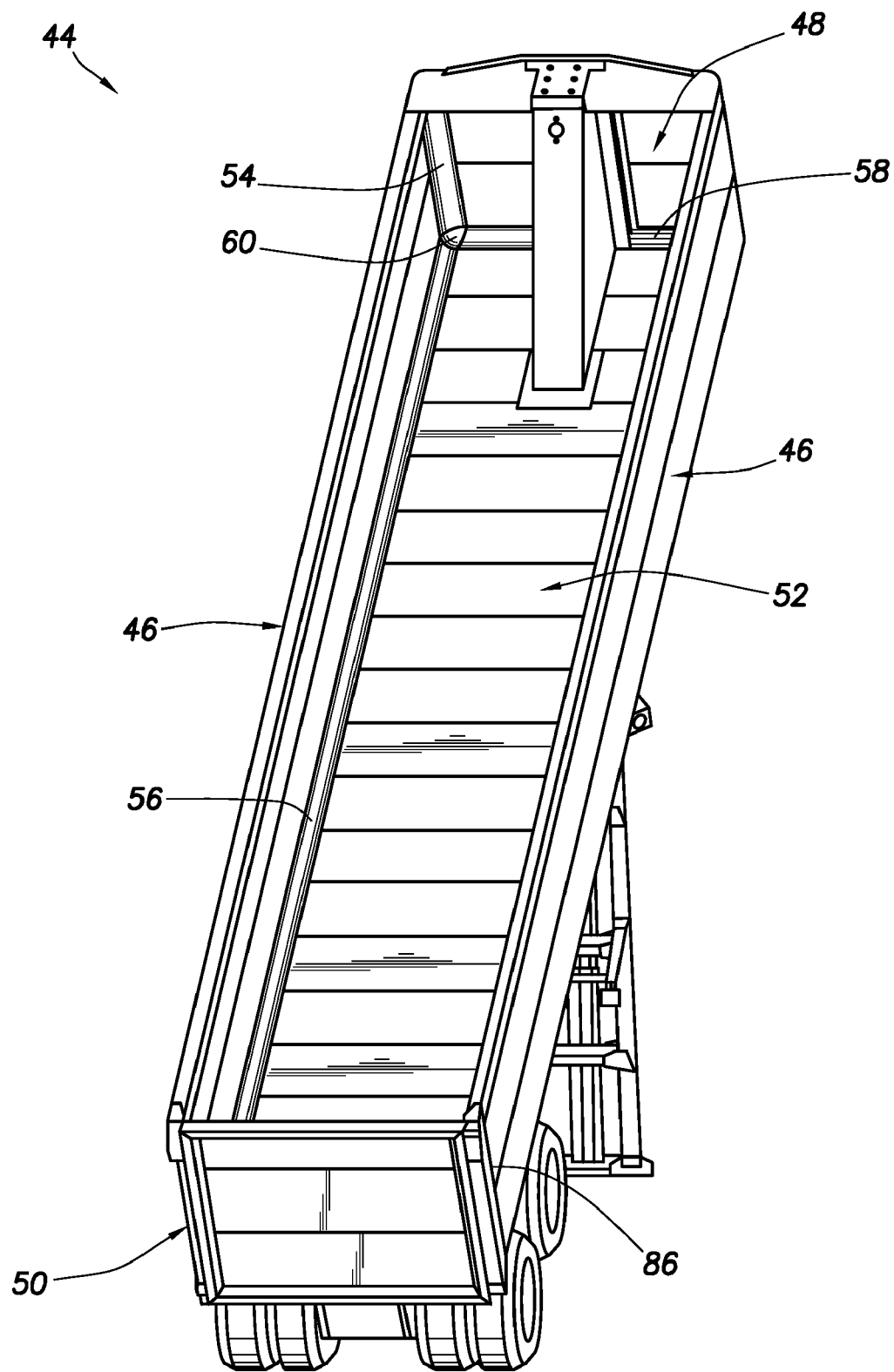
FIG. 5 is an isometric view of the trailer assembly with the trailer raised for dumping.

Referring additionally now to FIGS. 3-5, a trailer assembly 44 is representatively and schematically illustrated. The trailer assembly 44 uses the panels 20 and trailer wall construction 10 described above in its walls, including two generally vertically oriented side walls 46 extending between front and rear ends of the trailer, a generally vertically oriented front wall 48, a generally vertically oriented tailgate 50, and a floor 52.

As depicted in FIGS. 3-5, the trailer assembly 44 is used to haul loose material, and then dump the material by elevating the front end of the trailer while the tailgate 50 is opened. However, it should be clearly understood that other types of trailers can utilize the trailer wall construction 10. For example, the trailer could be of the type known to those skilled in the art as a "tipper", the walls could form a container which is releasably attached to a frame of the trailer (e.g., so that the container can also be transported by train, ship, etc.), the trailer could be used to haul cargo other than loose material, etc. Thus, the principles of the invention are not limited to the specific details of the trailer assembly 44 described herein.

By constructing the side walls 46, front wall 48, floor 52 and tailgate 50 using the trailer wall construction 10 described above, a tare weight of the trailer assembly 44 is significantly reduced. In another important feature of the trailer assembly 44, the side walls 46 are joined to the front wall 48, and the side and front walls are joined to the floor 52 in a manner which reduces square corners between these walls, thereby providing for clearer dumping of the material transported by the trailer.

Specifically, two curved connectors 54 are used to join a front edge of each side wall 46 to side edges of the front wall 48, two curved connectors 56 are used to join a lower edge of each side wall to side edges of the floor 52, and another curved connector 58 is used to join a lower edge of the front wall to a front edge of the floor. These curved connectors 54, 56, 58 are attached at junctures between the walls 46, 48, 52 by two spherically shaped corners 60. In FIG. 5, the manner in which these features combine to provide a generally smooth interior for the trailer assembly 44 may be seen.

Each of the side walls 46, front wall 48 and tailgate 50 includes at least two of the panels 20. The panels 20 extend horizontally, so that the interlocking edges 12, 14 also extend horizontally. The floor 52 includes multiple panels 20, each of which extends from side to side of the trailer assembly 44. However, it is not necessary for the panels 20 to extend in any particular direction in the side walls 46, front wall 48, tailgate 50 and floor 52, and any number of the panels may be used in any wall of the trailer assembly 44, in keeping with the principles of the invention.

Figure 6:
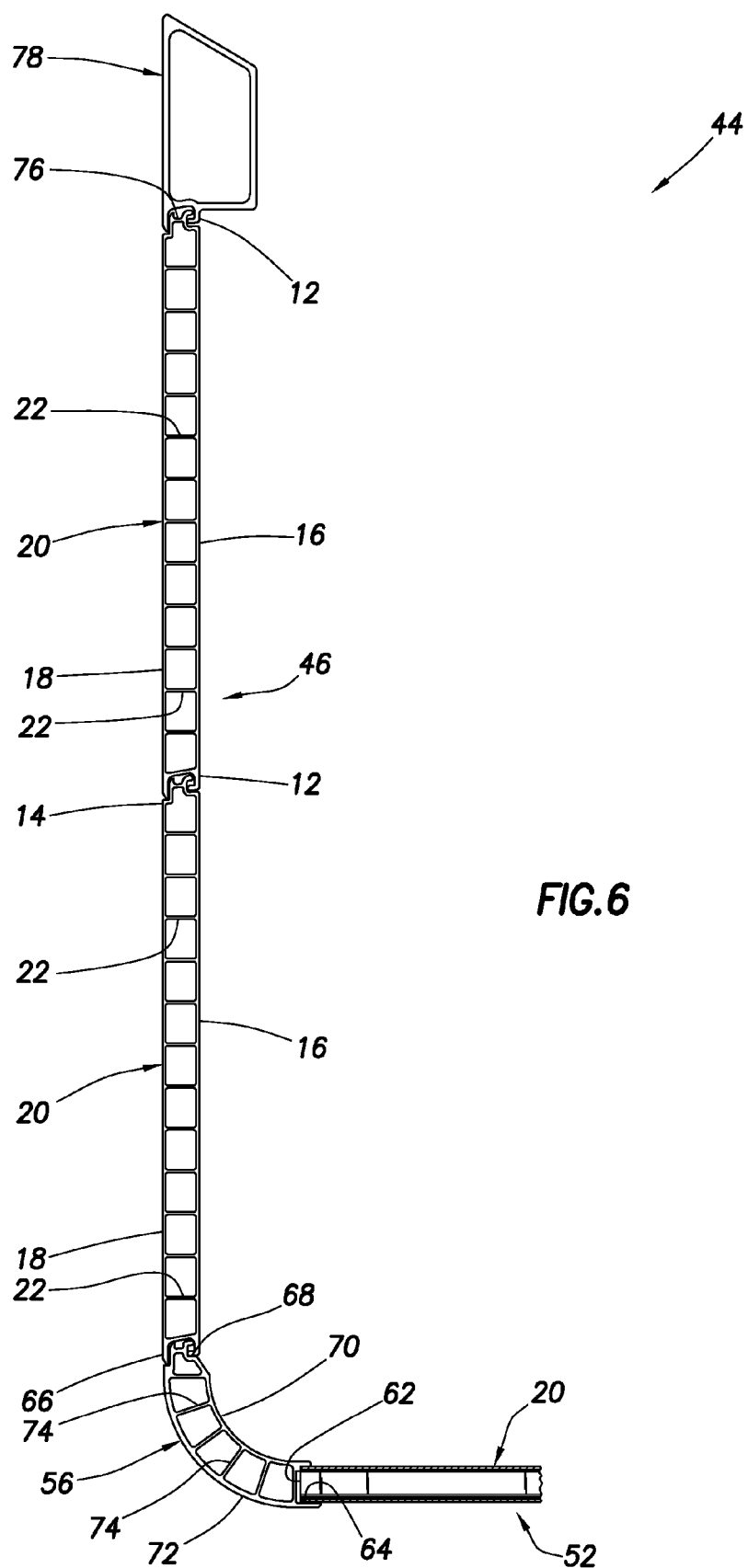
FIG. 6 is a cross-sectional view of a side wall of the trailer wall construction, and a juncture of the side wall with a floor of the trailer wall construction.

Referring additionally now to FIG. 6, a cross-sectional view of one of the side walls 46 and a portion of the floor 52 is representatively illustrated. In this view, the manner in which the side wall 46 is connected to the floor 52 using the curved connector 56 may be clearly seen.

A side edge 62 of the floor 52 is received in a recess 64 formed in the curved connector 56. The floor 52 may be welded to the curved connector 56 along seams therebetween and/or adhesive bonding or mechanical fasteners may be used to attach the floor to the curved connector generally as described above in relation to FIG. 2. Any method may be used for attaching the floor 52 to the curved connector 56 in keeping with the principles of the invention.

A lower edge 66 of the side wall 46 is interlocked with an upper edge 68 of the curved connector 56. The upper edge 68 of the curved connector 56 is configured in a similar manner to the panel edge 14. The side wall 46 may be attached to the curved connector 56 in a manner similar to that described above for attaching the panels 20 to each other and illustrated in FIG. 2. However, it should be understood that any type of attachment method may be used in keeping with the principles of the invention.

Note that the curved connector 56 is also similar to the panels 20 in that it includes an inner shell 70, an outer shell 72 and spaced apart interior webs 74 joining the spaced apart inner and outer shells. Thus, the curved connector 56 is very similar to one of the panels 20, except that it is curved approximately 90 degrees along its length (each of the shells 70, 72 being radiused in a cylindrical shape, with the webs 74 being radially oriented), and it has the recess 64 in place of the edge 12 of the panel. If the panels 20 of the floor 52 were oriented longitudinally, rather than laterally, in the trailer assembly 44, then the recess 64 could be replaced with an appropriate one of the interlocking edges 12, 14 for attachment to the corresponding edge of the floor panel.

At an upper edge 76 of the side wall 46 is a top connector 78, which is also preferably a generally hollow extruded aluminum alloy item. The connector 78 could include interior webs also, if desired. The connector 78 has an interlocking edge 12 formed thereon for attachment to the upper edge 76 of the side wall 46, in a manner similar to that described above for attaching the panels 20 to each other and illustrated in FIG. 2 (for example, welding, adhesive bonding, use of mechanical fasteners, etc.). However, it should be understood that any type of attachment method may be used in keeping with the principles of the invention.

Several benefits are realized by the trailer wall construction as depicted in FIG. 6. For example, the curved connector 56 and top connector 78 are relatively light in weight and thereby serve to aid in reducing the tare weight of the trailer assembly 44, the interior of the trailer wall construction is smooth, with sharp corners minimized, and the exterior of the trailer is smooth and aesthetically pleasing.

Figure 7:
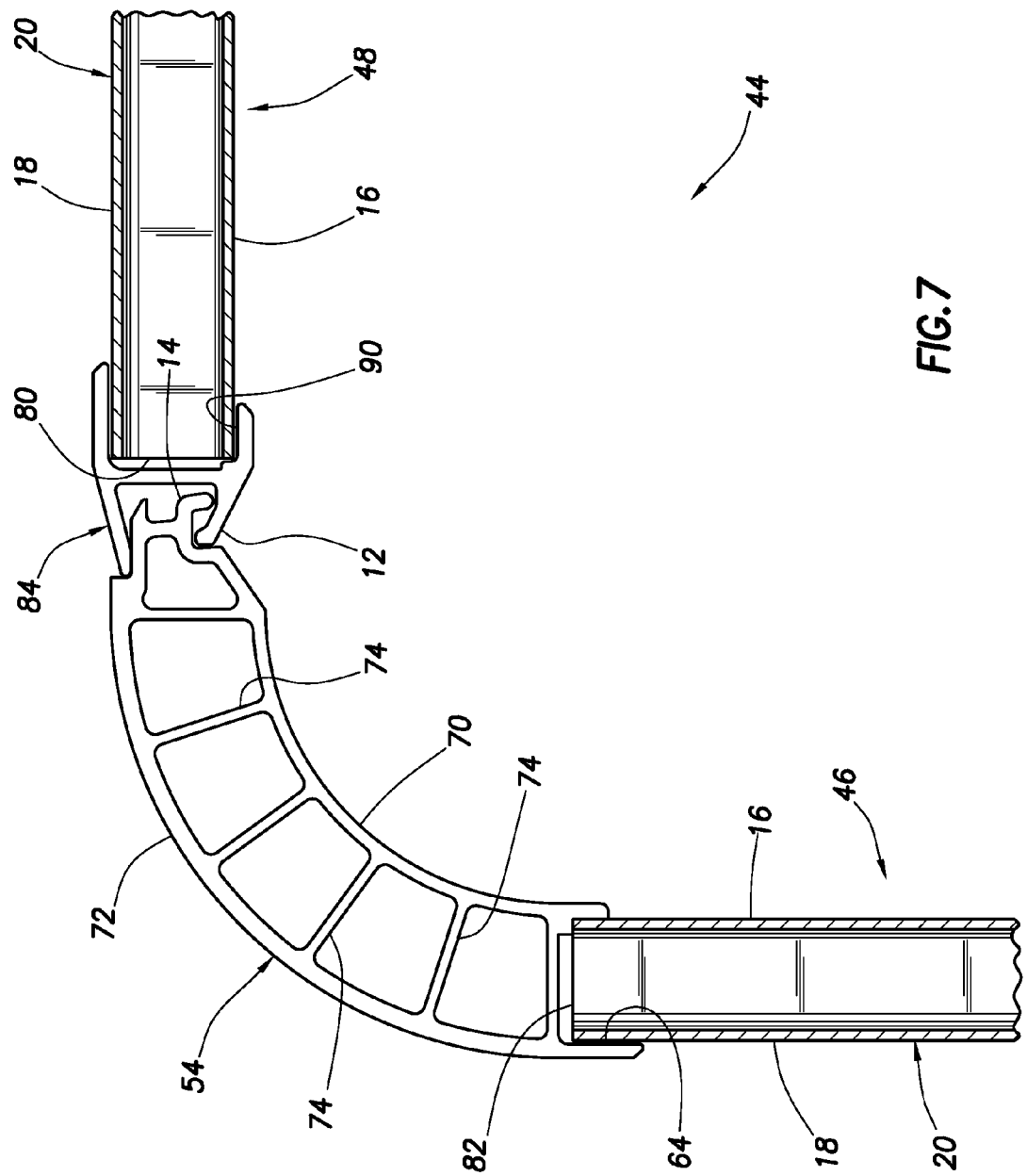
FIG. 7 is a cross-sectional view of the side wall, and a juncture of the side wall with a front wall of the trailer wall construction.

Referring additionally now to FIG. 7, a cross-sectional view of a connection between one of the side walls 46 and the front wall 48 is representatively and schematically illustrated. In this view it may be seen that the curved connector 54 is used to connect a side edge 80 of the front wall 48 to a front edge 82 of the side wall 46. It may also be seen that the curved connector 54 is configured very similar to the curved connector 56 described above, in that it includes the radiused inner and outer walls 70, 72, webs 74, recess 64 on one edge and interlocking edge 14.

An adapter 84 is used as a transition between the interlocking edge 14 of the curved connector 54 and the side edge 80 of the front wall 48. The adapter 84 has a recess 90 (similar to the recess 64) to receive the front wall panels 20 therein at the side edge 80 of the front wall 48, and an interlocking edge 12 to mate with the edge 14 of the curved connector 54.

The attachment methods used between the side wall 46 and the curved connector 54 (at the edge 82 and recess 64), between the curved connector and the adapter 84 (at the interlocking edges 12, 14), and between the adapter and the front wall 48 (at the recess 90 and edge 80) may be similar to that described above for attaching the panels 20 to each other and illustrated in FIG. 2 (for example, welding, adhesive bonding, use of mechanical fasteners, etc.). However, it should be understood that any type of attachment method may be used in keeping with the principles of the invention.

Note that it is not necessary for the adapter 84 to be used between the curved connector 54 and the front wall 48. For example, the curved connector 54 could be provided with another recess 64 in place of the interlocking edge 14, so that the front wall 48 could be received in this other recess. An example of such a curved connector is shown in FIG. 12 and described further below.

The curved connector 58 used between the lower edge of the front wall 48 and the front edge of the floor 52 may be similar to the curved connectors 54, 56 described above. Since the lower edge of the front wall 48 may include an interlocking edge 12 (similar to the lower edge 66 of the side walls 46), and the front edge of the floor 52 may include an interlocking edge 14 (similar to the top edge 76 of the side walls, the curved connector 58 may be provided with appropriate interlocking edges 12, 14 to mate with the front wall and floor edges, or appropriate adapters may be provided, etc. The curved connector 58 may be attached to the front wall 48 and the floor 52 using any methods, including those described above for attaching the panels 20 to each other and illustrated in FIG. 2 (for example, welding, adhesive bonding, use of mechanical fasteners, etc.).

Referring again to FIGS. 3-5, a rear post 86 is attached at a rear edge 88 of each side wall 46. The rear post 86 serves several functions, including connecting the panels 20 at the rear edge 88 of each side wall 46, providing structural support for the rear end of the side wall 46, interfacing with the tailgate 50, etc.

Figure 8:
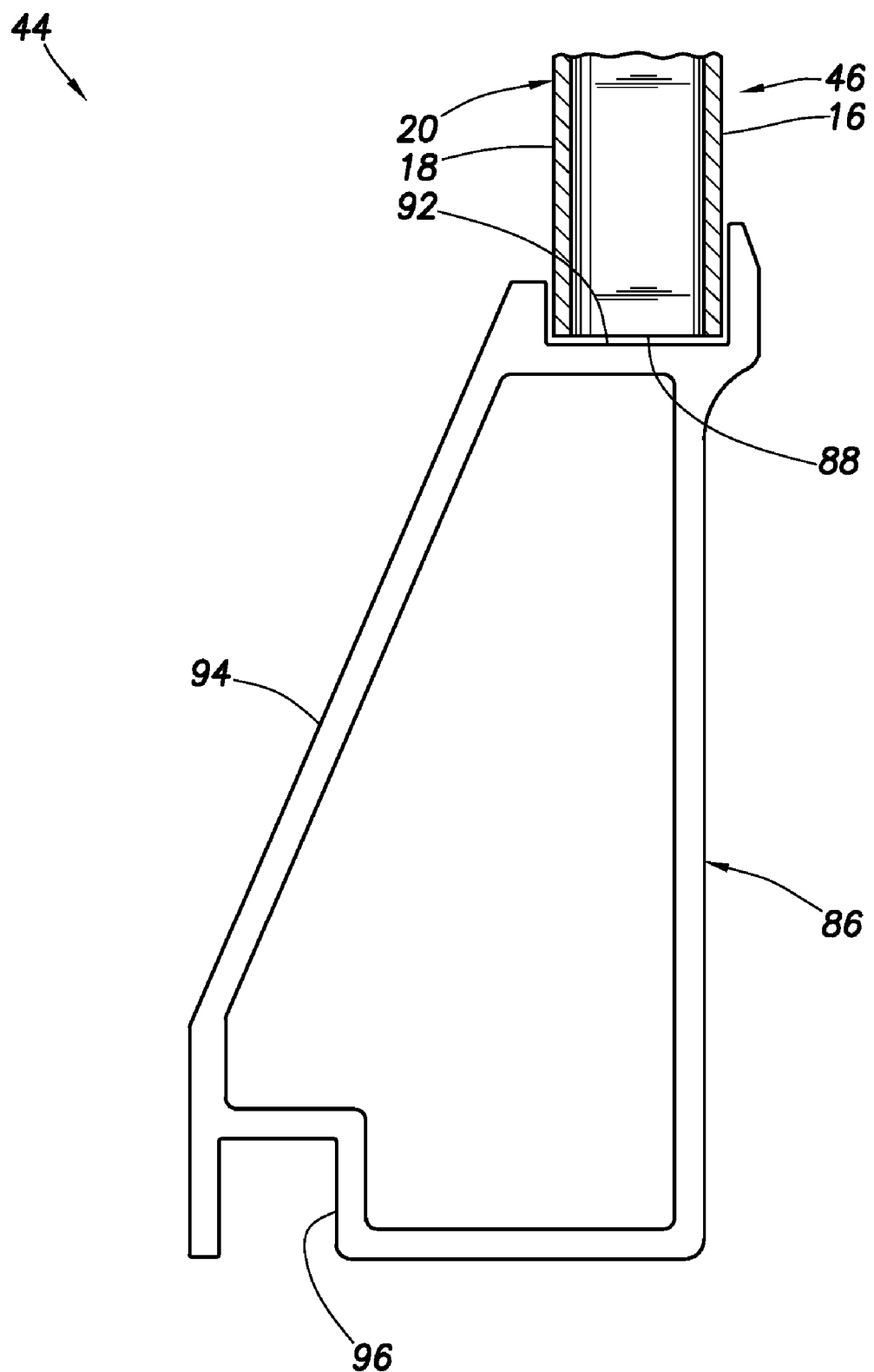
FIG. 8 is a cross-sectional view of a rear post of the trailer wall construction.

Referring additionally now to FIG. 8, a cross-sectional view of one of the rear posts 86 and a portion of the corresponding side wall 46 is representatively illustrated. In this view it may be seen that the rear post 86 is preferably an extruded generally hollow structure made of an aluminum alloy, although other configurations, manufacturing methods, materials, etc. may be used in keeping with the principles of the invention.

The rear post 86 includes a recess 92 in which the rear edge 88 of the side wall 46 is received. The rear post 86 may be attached to the side wall 46 (at the edge 88 and recess 92) using any appropriate method, including any of those methods described above for attaching the panels 20 to each other and illustrated in FIG. 2 (for example, welding, adhesive bonding, use of mechanical fasteners, etc.).

The rear post 86 widens from its forward end (at the recess 92) to its rearward end. Preferably, an inner shell 94 of the rear post 86 is inclined toward the interior of the trailer assembly 44. Another recess 96 is provided at the rearward end of the rear post 86 to receive a flange (not shown) of a frame provided about the panels 20 of the tailgate 50.

Referring additionally now to FIG. 9, the spherical shaped corner 60 is representatively illustrated from a top plan view thereof. In this view it may be seen that the corner 60 is preferably a generally hollow casting made of an aluminum alloy, although other configurations, manufacturing methods, materials, etc. may be used in keeping with the principles of the invention. In FIG. 10, the corner 60 is depicted from an isometric view.

The corner 60 includes an inner generally spherical shaped shell 98, and an outer generally spherical shaped shell 100 spaced apart from the inner shell. The corner 60 is approximately one-eighth of a hollow spherical shell, having three generally flat edges 102, 104, 106 which are orthogonal to each other. Webs 108 at corners between the edges 102, 104, 106 serve to connect the inner and outer shells 98, 100.

In use, the top edge 102 is attached to a lower end of the curved connector 54, and each of the side edges 104, 106 is attached to an end of a corresponding one of the curved connectors 56, 58. Preferably, the corner 60 is welded to the ends of the curved connectors 54, 56, 58, but any appropriate attachment method may be used in keeping with the principles of the invention.

It will be appreciated that the corner 60 provides a convenient, structurally robust, light weight and aesthetically pleasing way to connect the curved connectors 54, 56, 58.

Figure 11:
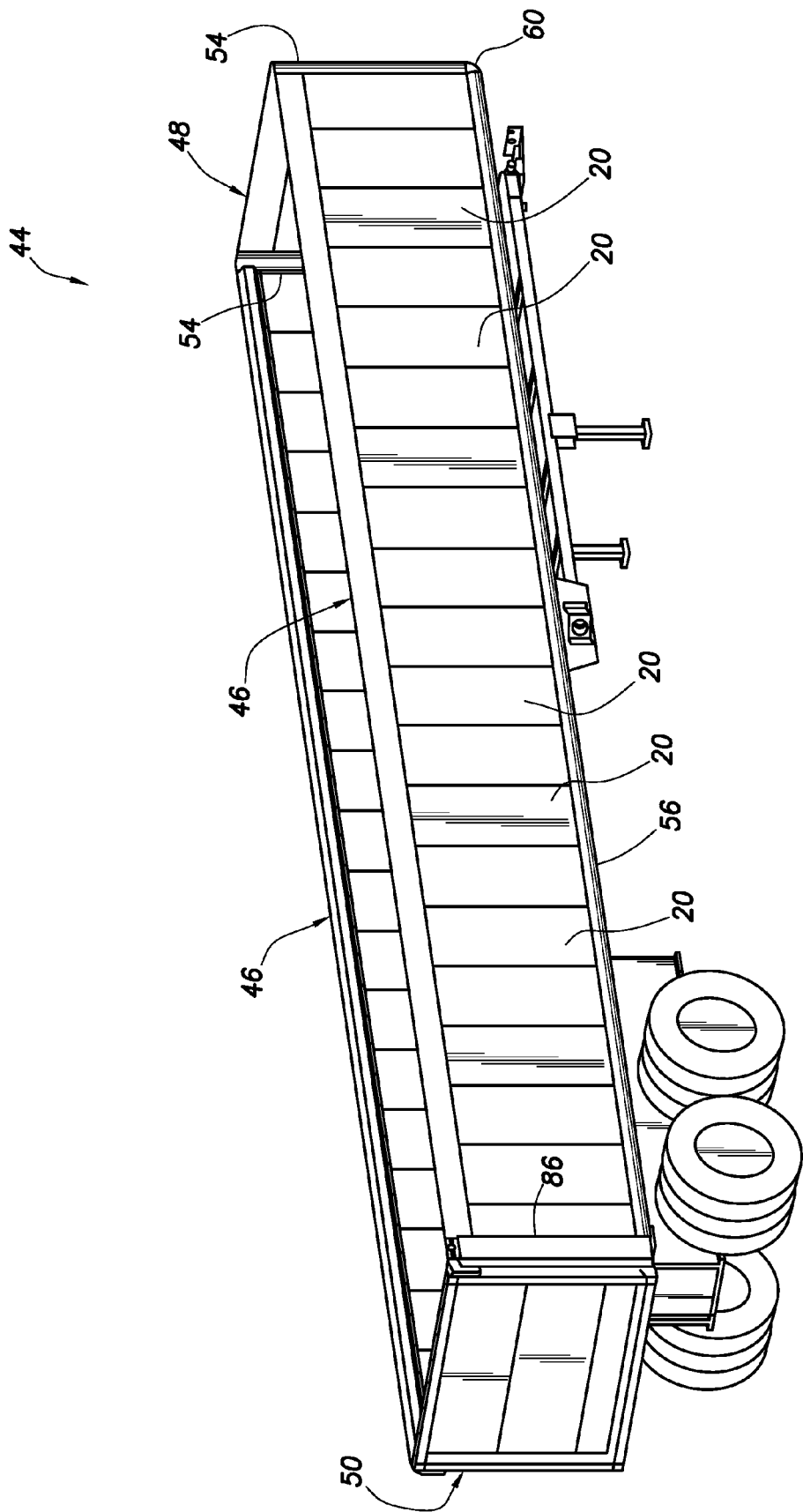
FIG. 11 is an isometric view of an alternate trailer assembly incorporating an alternate trailer wall construction of the invention.

Referring additionally now to FIG. 11, an alternate configuration of the trailer assembly 44 is representatively illustrated. This alternate configuration is similar in most respects to that depicted in FIGS. 3-5 and described above, however, the side walls 46 of the alternate configuration have the panels 20 extending in a generally vertical direction, instead of in a generally horizontal direction. This alternate configuration demonstrates that various changes may be made to the specific trailer wall constructions described herein, without departing from the principles of the invention.

Due to the vertical orientation of the panels 20 in the side walls 46 in the alternate configuration depicted in FIG. 11, various changes are also made to the connectors used about the edges of the attached panels. Two of these changes are represented in FIGS. 12 and 13.

In FIG. 12 a cross-sectional view of a modified curved connector 56, and portions of the floor 52 and one of the side walls 46 are depicted. In this view it may be seen that the curved connector 56 has been modified so that it has two of the recesses 64, an upper one of which receives the lower edge 66 of the side wall 46 (which, due to the vertical orientation of the panels 20, no longer has the interlocking edge 12).

Similarly, in FIG. 13 a cross-sectional view of a modified top connector 78 and an upper portion of one of the side walls 46 is depicted. In this view it may be seen that the top connector 78 has been modified so that it has one of the recesses 64 at its lower end which receives the upper edge 76 of the side wall 46 (which, due to the vertical orientation of the panels 20, no longer has the interlocking edge 14).

It will be readily appreciated that modifications are also made to the rear post 86 and curved connector 54 to accommodate the vertical orientation of the panels 20 in the side walls 46. For example, instead of the side walls 46 being received in the recesses 64, 92 of the curved connector 54 and rear post 86, appropriate interlocking edges 12, 14 may be used. As another example, appropriately configured adapters could be used to transition from the interlocking edges 12, 14 on the side walls 46 to the recesses 64, 92 of the curved connector 54 and rear post 86.

It will also be readily appreciated that any of the other walls 48, 50, 52 of the trailer assembly 44 could have the panels 20 therein oriented differently. For example, the panels 20 in the front wall 48 and tailgate 50 could be generally vertically oriented, the panels 20 in the floor 52 could extend front to rear, etc. The panels 20 could be diagonally or otherwise oriented in any of the walls 46, 48, 50, 52 in keeping with the principles of the invention.

Although the trailer wall construction 10 has been described herein as being used in the trailer assembly 44, which is depicted as being a dump trailer, it should be clearly understood that the trailer wall construction may be used in any type of trailer in keeping with the principles of the invention. For example, the trailer wall construction 10 could be used in a trailer assembly which has a roof wall. The roof wall could be constructed of attached panels 20. As another example, the trailer wall construction 10 could be used in a container which is releasably attached to a trailer frame, etc.

Note that any of the generally hollow structures described herein, such as the curved connectors 54, 56, 58, corner 60, top connector 78, and rear post 86, as well as any of the panels 20, can utilize the hardenable material 40 therein for reinforcement, reduced weight, etc.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A trailer wall construction for use as part of a trailer assembly, the trailer wall construction comprising:
   a generally vertically extending front wall;
   a generally vertically extending side wall;
   a floor;
   each of the floor and front wall including at least one panel comprising spaced apart inner and outer shells;
   a first curved connector connecting a lower edge of the front wall to a front edge of the floor;
   a second curved connector connecting a lower edge of the side wall to a side edge of the floor; and
   a third curved connector connecting a side edge of the side wall to a side edge of the front wall.

2. The trailer wall construction of claim 1, further comprising a spherical shaped corner attached to each of the first, second and third curved connectors.

3. The trailer wall construction of claim 2, wherein the spherical shaped corner includes spaced apart inner and outer spherical shaped shells.

4. The trailer wall construction of claim 1, wherein the floor includes multiple panels attached to one another.

5. The trailer wall construction of claim 1, wherein the front wall includes multiple panels attached to one another.

6. The trailer wall construction of claim 1, wherein at least one of the floor and front wall includes multiple panels, the panels being adhesively bonded to one another.

7. The trailer wall construction of claim 6, wherein the panels are further welded to one another.

8. The trailer wall construction of claim 7, wherein the panels are further fastened to one another using at least one mechanical fastener.

9. The trailer wall construction of claim 1, wherein at least one of the floor and front wall includes multiple panels, the panels being welded to one another, and wherein the panels are further fastened to one another using at least one mechanical fastener.

10. The trailer wall construction of claim 1, wherein each panel is an aluminum alloy extrusion having multiple spaced apart interior webs extending between the inner and outer shells.

11. The trailer wall construction of claim 1, further comprising a hardenable material positioned within a cavity in at least one of the front wall and the floor.

12. The trailer wall construction of claim 1, further comprising a hardenable material positioned within a cavity in the first curved connector.

* * * * *